(12) United States Patent
Chikamura

(10) Patent No.: US 7,783,970 B2
(45) Date of Patent: Aug. 24, 2010

(54) PROCESSING APPARATUS, METHOD OF DISPLAYING AN IMAGE, AND A METHOD OF PRODUCING A VOICE OR SOUND

(75) Inventor: Shingo Chikamura, Chiba (JP)

(73) Assignee: Alpine Electronics, Inc., Tokyo (JP)

( * ) Notice: Subject to any disclaimer, the term of this patent is extended or adjusted under 35 U.S.C. 154(b) by 1087 days.

(21) Appl. No.: 11/390,487

(22) Filed: Mar. 27, 2006

(65) Prior Publication Data

US 2006/0230336 A1  Oct. 12, 2006

(30) Foreign Application Priority Data

Apr. 11, 2005  (JP) .............................. 2005-113120

(51) Int. Cl.
*G06F 17/00* (2006.01)
(52) U.S. Cl. .................. 715/248; 715/233; 715/230
(58) Field of Classification Search .................. 715/710
See application file for complete search history.

(56) References Cited

U.S. PATENT DOCUMENTS

| | | | |
|---|---|---|---|
| 5,555,098 A | 9/1996 | Parulski | |
| 6,005,964 A * | 12/1999 | Reid et al. ................... | 382/133 |
| 6,791,583 B2 * | 9/2004 | Tang et al. ................... | 715/751 |
| 7,020,658 B1 * | 3/2006 | Hill .............................. | 707/102 |
| 7,072,683 B2 * | 7/2006 | King et al. ............... | 455/550.1 |
| 7,196,718 B1 * | 3/2007 | Barbeau et al. .......... | 348/14.02 |
| 2002/0021309 A1 * | 2/2002 | Burnhouse et al. .......... | 345/810 |
| 2003/0013432 A1 * | 1/2003 | Fukaya ........................ | 455/412 |
| 2003/0016800 A1 * | 1/2003 | Fukuda .................. | 379/142.01 |
| 2004/0102225 A1 * | 5/2004 | Furuta et al. ................ | 455/566 |
| 2004/0109558 A1 * | 6/2004 | Koch ...................... | 379/373.01 |
| 2004/0119755 A1 * | 6/2004 | Guibourge .................. | 345/827 |
| 2004/0222975 A1 * | 11/2004 | Nakano et al. .............. | 345/173 |
| 2004/0225390 A1 * | 11/2004 | Keller et al. .................. | 700/95 |
| 2005/0108314 A1 * | 5/2005 | Autio et al. .................. | 709/200 |
| 2005/0143135 A1 * | 6/2005 | Brems et al. ................ | 455/564 |

(Continued)

FOREIGN PATENT DOCUMENTS

JP  2001-285420  10/2001

(Continued)

OTHER PUBLICATIONS

Author: Koers, Title: Microsoft XP fast&easy, Date: 2002, Publisher: Premier Press, pp. 152.*

*Primary Examiner*—Kee M Tung
*Assistant Examiner*—David H Chu
(74) *Attorney, Agent, or Firm*—Brinks Hofer Gilson & Lione

(57) ABSTRACT

A processing apparatus is adapted to, when a particular action occurs, display information relevant to the action and also display an image assigned to the action. In this processing apparatus, image data of a large number of images is stored in an image storage unit, and a memory unit stores the correspondence between an image and an action when the image is assigned to the action. When a particular action occurs, a control unit performs a control such that the image assigned to the action is displayed. When a list of images stored in the image storage unit is displayed, the control unit controls displaying such that any action related to each image is explicitly shown in the list of images.

8 Claims, 15 Drawing Sheets

| IMAGE ID | IMAGE #2 | | | |
|---|---|---|---|---|
| ACTION \ DETAILS | USED/NOT USED | DESTINATION/ALBUM | | ... |
| HFT | USED | ALPINE TARO | INOKI | ... |
| MR | USED | ALBUM #1 | ALBUM #5 | ... |
| WALLPAPER | NOT USED | | | |

UDT ⏟   DTL ⏟

U.S. PATENT DOCUMENTS

| | | |
|---|---|---|
| 2005/0206611 A1* | 9/2005 | Ching et al. .............. 345/156 |
| 2005/0258938 A1* | 11/2005 | Moulson ................... 340/7.58 |
| 2005/0286856 A1* | 12/2005 | Aerts ......................... 386/46 |
| 2006/0056604 A1* | 3/2006 | Sylthe et al. ........... 379/100.13 |
| 2006/0259434 A1* | 11/2006 | Vilcauskas et al. ............ 705/57 |
| 2009/0018844 A1* | 1/2009 | Baker ............................ 705/1 |

FOREIGN PATENT DOCUMENTS

JP          2003-204510          7/2003

* cited by examiner

FIG. 4A

| IMAGE ID |
|---|
| IMAGE #1 |
| IMAGE #2 |
| ⋮ |
| IMAGE #N |

FIG. 4B

| IMAGE ID | IMAGE #2 | | | | |
|---|---|---|---|---|---|
| ACTION \ DETAILS | USED/NOT USED | DESTINATION/ALBUM | | | ... |
| HFT | USED | ALPINE TARO | INOKI | ... | |
| MR | USED | ALBUM #1 | ALBUM #5 | ... | |
| WALLPAPER | NOT USED | | | | |

UDT — DTL

FIG. 5
(A)
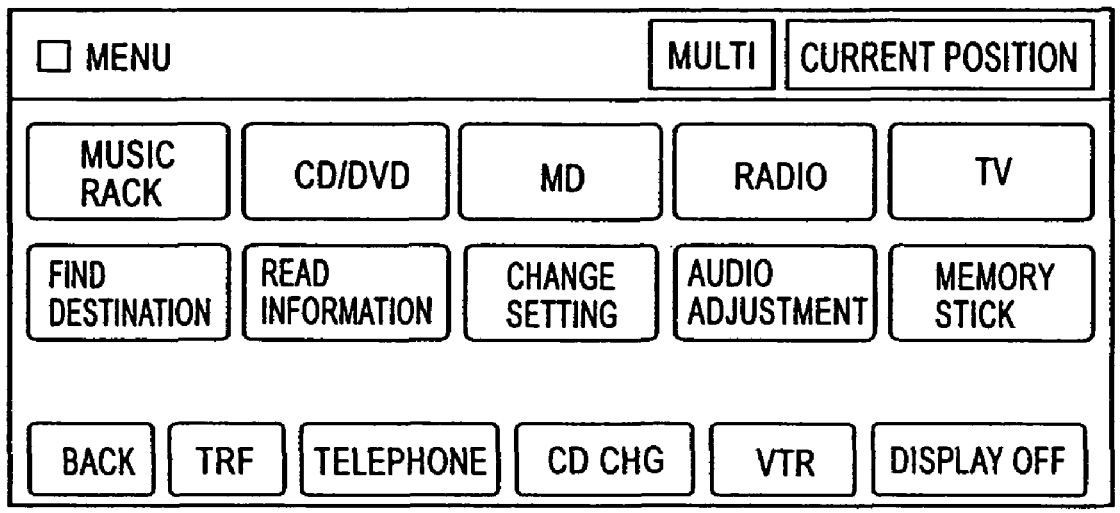
(B)
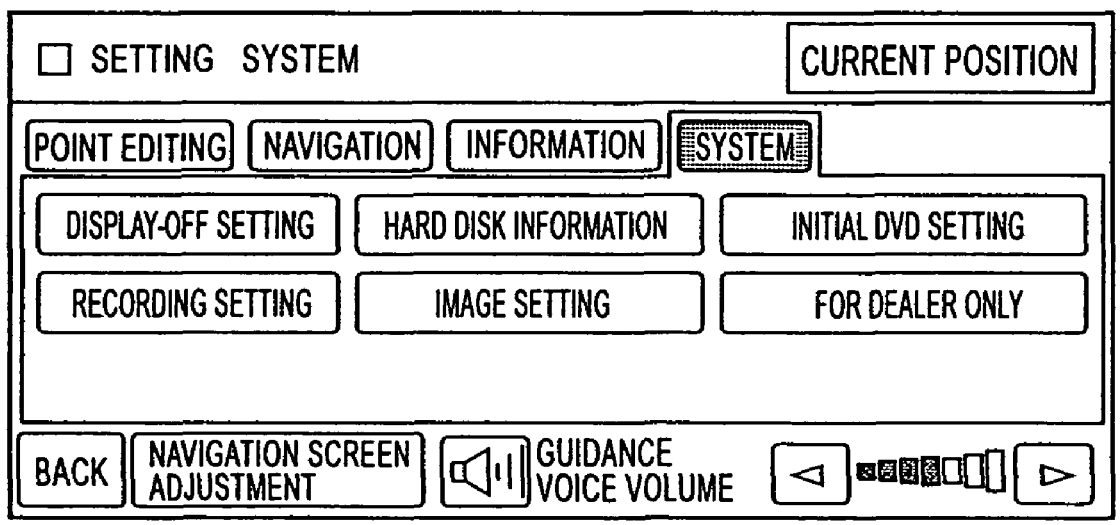

FIG. 10
(A)
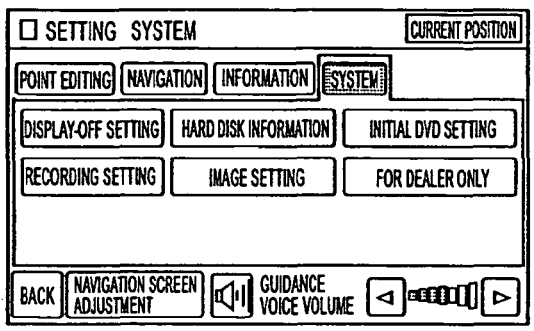
(B)
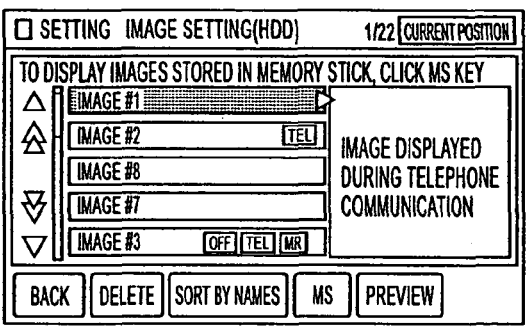
(C)
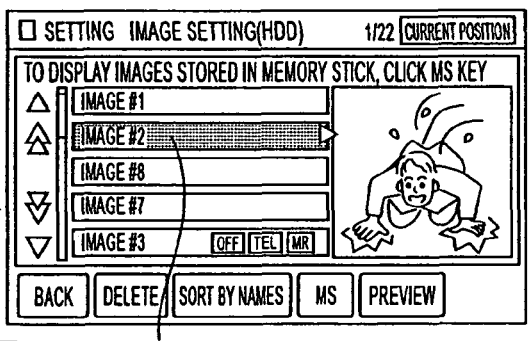
(D)
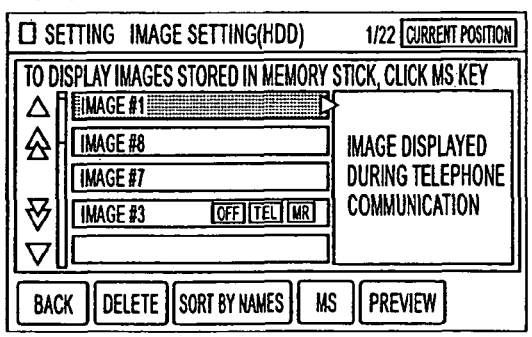

FIG. 15
(A)
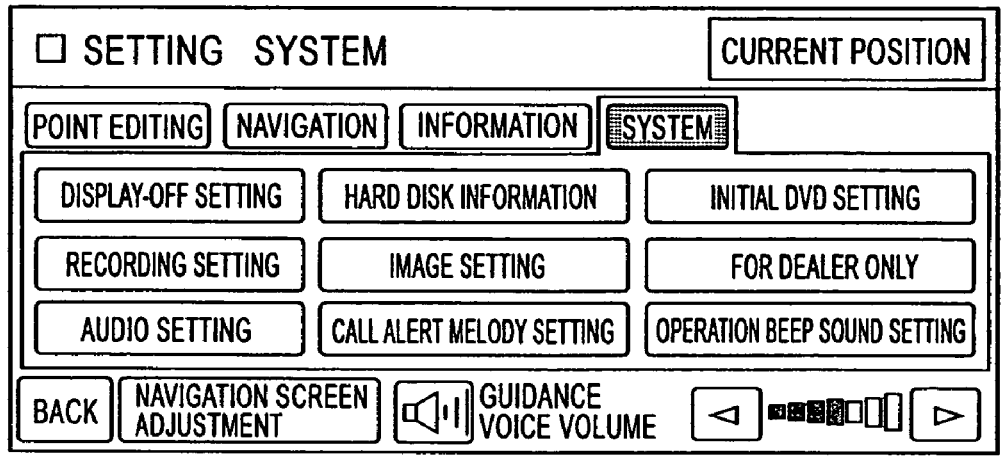
(B)
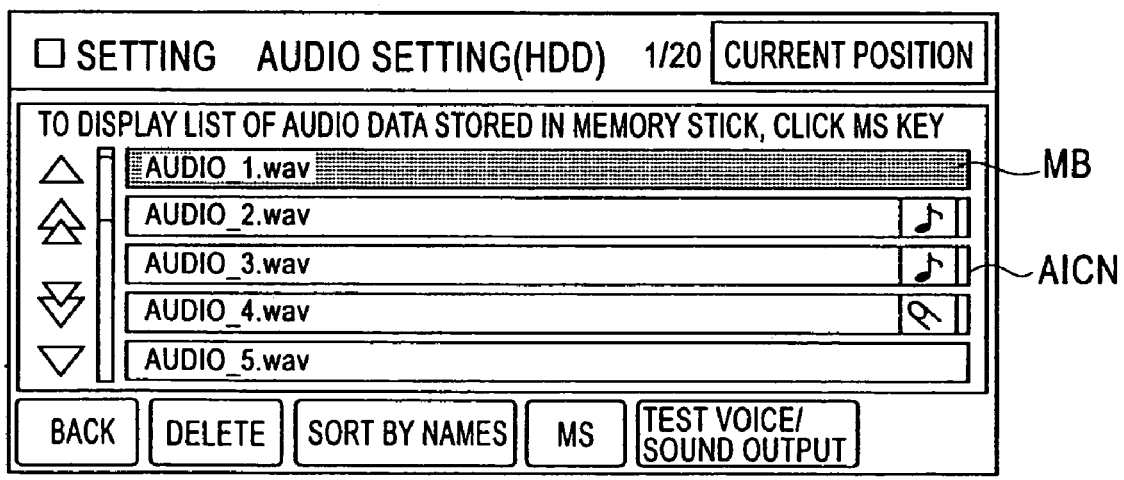

PROCESSING APPARATUS, METHOD OF DISPLAYING AN IMAGE, AND A METHOD OF PRODUCING A VOICE OR SOUND

BACKGROUND OF THE INVENTION

1. Field of the Invention

The present invention relates to a processing apparatus, a method of displaying an image, and a method of producing a voice or sound, and more particularly to a processing apparatus, a method of displaying an image, and a method of producing a voice or sound, capable of, when a particular action occurs in the processing apparatus, displaying information relevant to the action and also displaying an image assigned to the action or producing a voice or sound assigned to the action.

2. Description of the Related Art

Modern in-vehicle apparatuses have various intelligent functions such as a hands-free telephone communication function, a navigation function, and audio functions, whereby a user is allowed to drive a vehicle in accordance with a navigation map while listening to music, and the user is also allowed to make an outgoing telephone call or receive an incoming telephone call in a hands-free mode to communicate with a communication party via a base station and a public telephone network.

An in-vehicle apparatus of this type includes a hard disk serving as a mass storage device for storing various images used for various purposes. For example, a user is allowed to select an image, from the images stored on the hard disk, for use as wallpaper (an image that is displayed in a display-off state) or a background image of a menu. As another example, when an incoming telephone call is received or an outgoing telephone call is transmitted, an image corresponding to a communication party (for example, a portrait of a person with whom a telephone communication is made or a scenic shot of his/her residence or the like) can be displayed. When music data copied from a music CD to the hard disk is played back, a jacket image of the music CD or an image of a playing artist can be displayed on an album-by-album basis.

In addition to images, it is also possible to store various kinds of voices or sounds (music melodies, operation beep sounds, guidance voices, etc.) for use in various situations. For example, when an incoming telephone call arrives, a telephone call alert melody is generated depending on a caller. When a particular operation key is clicked, an operation beep sound is produced. It is also known to predefine the correspondence between music data and image data and display an image based on image data corresponding to music data when the music data is played back (see, for example, Japanese Unexamined Patent Application Publication No. 2003-303488).

SUMMARY OF THE INVENTION

However, because of the limitation of the storage capacity of the hard disk installed in the in-vehicle apparatus, the maximum number of image files stored on the hard disk is currently limited to about 200 files. Because of this limitation, images are used for multiple purposes. When there is a new image to be added, if the hard disk has no free storage space to store the new image, an unnecessary existing image is deleted to create storage space to store the new image. However, in the conventional technique, it is very troublesome to check which image is used for which purpose. That is, it is very troublesome to find unused images and delete detected unused images.

In view of the above, it an object of the present invention to provide a technique to easily determine which image or voice or sound is used for which purpose.

It is another object of the present invention to provide a technique to easily detect an unnecessary image or voice or sound and delete the detected unnecessary image or voice or sound.

To achieve the above objects, the present invention provides a method and a processing apparatus adapted to, when a particular action occurs, display information relevant to the action and also display an image assigned to the action. In this method and processing apparatus, image data of a large number of images is stored in an image storage unit, and, when an image is assigned to a particular action, the correspondence between the action and the assigned image is stored in a memory unit. When a particular action occurs, an image assigned to the action is displayed. When a list of images stored in the image storage unit is displayed, the correspondence between images and actions is explicitly represented in the list of images.

In this method and processing apparatus, when an image, which is displayed when an incoming or outgoing telephone call is received or transmitted, is assigned to a communication party, a list of images may be displayed in such a manner that any action related to each image is explicitly shown in the list of images. When an image, which is displayed when music data stored on a hard disk is played back, is assigned to a music album, a list of images may be displayed in such a manner that any action related to each image is explicitly shown in the list of images. When an image is specified which is displayed when a display-off command is issued, a list of images may be displayed in such a manner that any action related to each image is explicitly shown in the list of images.

The present invention also provides a method and a processing apparatus adapted to, when a particular action occurs, display information relevant to the action and also display an image assigned to the action, in which image data of a large number of images is stored in an image storage unit, and, when an image is assigned to a particular action, the correspondence between the action and the assigned image is stored in a memory unit. When a particular action occurs, an image assigned to the action is displayed. When a list of images is displayed, if a command to delete an image from the image storage unit is issued, an action name currently assigned to the image specified to be deleted is displayed.

The present invention also provides a method and a processing apparatus adapted to, when a particular action occurs, display information relevant to the action and also display an image assigned to the action, in which image data of a large number of images is stored in an image storage unit, and, when an image is assigned to a particular action, the correspondence between the action and the assigned image is stored in a memory unit. When a particular action occurs, an image assigned to the action is displayed in accordance with the stored correspondence. When a command to delete an image selected from a displayed list of images is issued, a selection menu is displayed to allow a selection of a deleting condition from among deleting the currently selected image, deleting all unused images, and deleting all images assigned to one or more particular actions. If a deleting condition is selected from the selection menu, deleting one image, deleting all unused images, or deleting all images assigned to respective one or more particular actions is performed in accordance with the selected deleting condition.

Note that not only displaying images but also producing voices or sounds can be controlled in a similar manner.

The present invention provides greater advantages. That is, in one aspect of the present invention, image data of a large number of images is stored in the image storage unit, the correspondence between an action and an image is stored in the memory unit when the image is assigned to the action, an image corresponding to an action is displayed when the action occurs, and when a request to display a list of images stored in the image storage unit is issued, the list of images is displayed in such a manner that any action related to each image is explicitly shown in the list of images, whereby a user can easily understand which image is in use.

In another aspect of the present invention, image data of a large number of images is stored in the image storage unit, the correspondence between an action and an image is stored in the memory unit when the image is assigned to the action, an action name assigned to an image is displayed when a command to delete the image from the image storage unit is issued, and, when a command to delete all unused images or all images assigned to specified actions from the image storage unit is issued, all unused images or all images assigned to the specified actions are deleted in accordance with the correspondence, thereby making it possible to detect unnecessary images and delete the detected unnecessary images.

In another aspect of the present invention, audio data of a large number of voices or sounds is stored in an audio data storage unit, the correspondence between an action and a voice or sound is stored when the voice or sound is assigned to the action, a voice or sound assigned to an action is produced when the action occurs, and when a list of audio data stored in the audio data storage unit is displayed, any action related to each image is explicitly displayed in the list of audio data, whereby a user can easily understand which audio data is in use.

In another aspect of the present invention, audio data of a large number of voices or sounds is stored in an audio data storage unit, the correspondence between an action and a voice or sound is stored when the voice or sound is assigned to the action, an action name assigned to audio data is displayed when a command to delete the audio data from the audio data storage unit is issued, and when a command to delete all unused audio data or all audio data assigned to specified actions from the audio data storage unit is issued, all unused images or all images assigned to the specified actions are deleted in accordance with the correspondence, thereby making it possible to detect unnecessary audio data and delete the detected unnecessary audio data.

BRIEF DESCRIPTION OF THE DRAWINGS

FIG. 4A shows a list of images stored in a data memory in a management controller,
and FIG. 4B shows a table representing the correspondence between images and actions;
FIG. 5A shows a menu screen,
and FIG. 5B shows a setting screen;
FIGS. 10A to 10D show a flow of a method of deleting an image from a hard disk;
FIGS. 15A and 15B show a flow of deleting audio data.

DESCRIPTION OF THE PREFERRED EMBODIMENTS

According to an embodiment of the present invention, there is provided a processing apparatus adapted to, when a particular action occurs, display information relevant to the action and also display an image assigned to the action, the processing apparatus including an image storage unit adapted to store image data of a large number of images, a memory unit adapted to, when an image is assigned to a particular action, store the correspondence between the action and the assigned image, and a control unit adapted to perform a control such that when a particular action occurs, an image assigned to the action is displayed, and such that when a list of images stored in the image storage unit is displayed, the correspondence between images and actions is explicitly represented in the list of images.

When an image, which is displayed when an incoming or outgoing telephone call is received or transmitted, is assigned to a communication party, the control unit displays a list of images in such a manner that any action related to each image is explicitly shown in the list of images. When an image, which is displayed when music data stored on a hard disk is played back, is assigned to a music album, the control unit displays a list of images in such a manner that any action related to each image is explicitly shown in the list of images. When an image is specified which is displayed when a display-off command is issued, the control unit displays a list of images in such a manner that any action related to each image is explicitly shown in the list of images.

When an image deletion command unit issues a command to delete an image, the control unit displays an action name assigned to the image specified to be deleted. When the image deletion command unit issues a command to delete all unused images or all images assigned to specified actions from the image storage unit, the control unit deletes all unused images or all images assigned to the specified actions in accordance with the stored correspondence.

First Embodiment—In-Vehicle Apparatus

Figure 1:
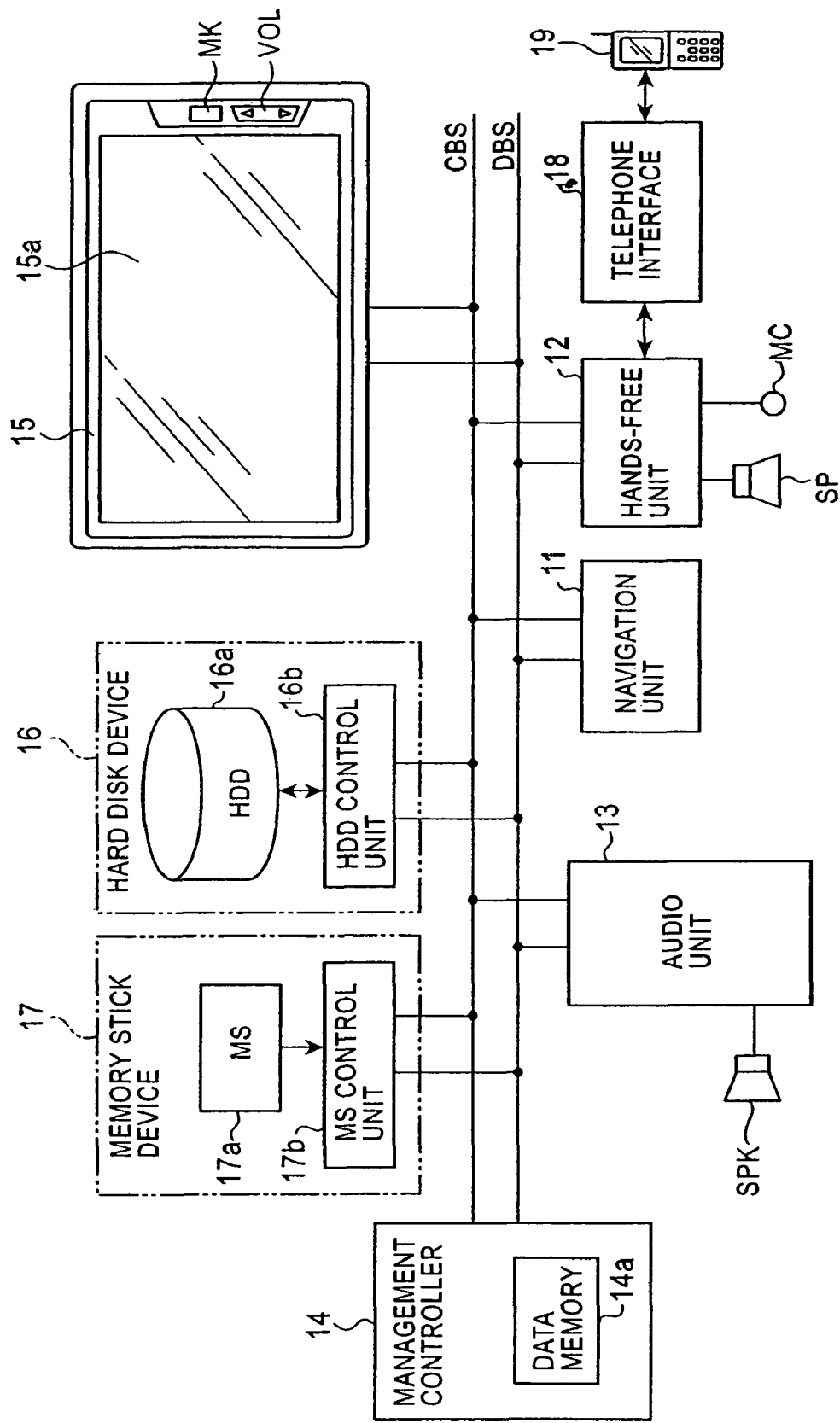
FIG. 1 is a block diagram of an in-vehicle apparatus.

FIG. 1 is a block diagram of an in-vehicle apparatus according to a first embodiment of the present invention. As shown in FIG. 1, the in-vehicle apparatus includes a navigation unit 11 responsible for a navigation operation, a hands-free unit 12 responsible for hands-free telephone communication, an audio unit 13, a management controller 14, a display 15, a hard disk drive 16, and a memory stick device 17. These units or devices are connected to each other through a control bus CBS or a data bus DBS. Although not shown in FIG. 1, other units such as a TV unit or an Internet unit may also be connected as required.

The hands-free unit 12 is connected to a portable telephone 19 through a telephone interface 18 so that a received voice or sound signal is produced from a speaker SP and a voice or sound spoken by a user is captured by a microphone MC and transmitted to a communication party from the portable telephone 19. Instead of the speaker SP, an audio speaker SPK may also be used for the above purpose.

Figure 2:
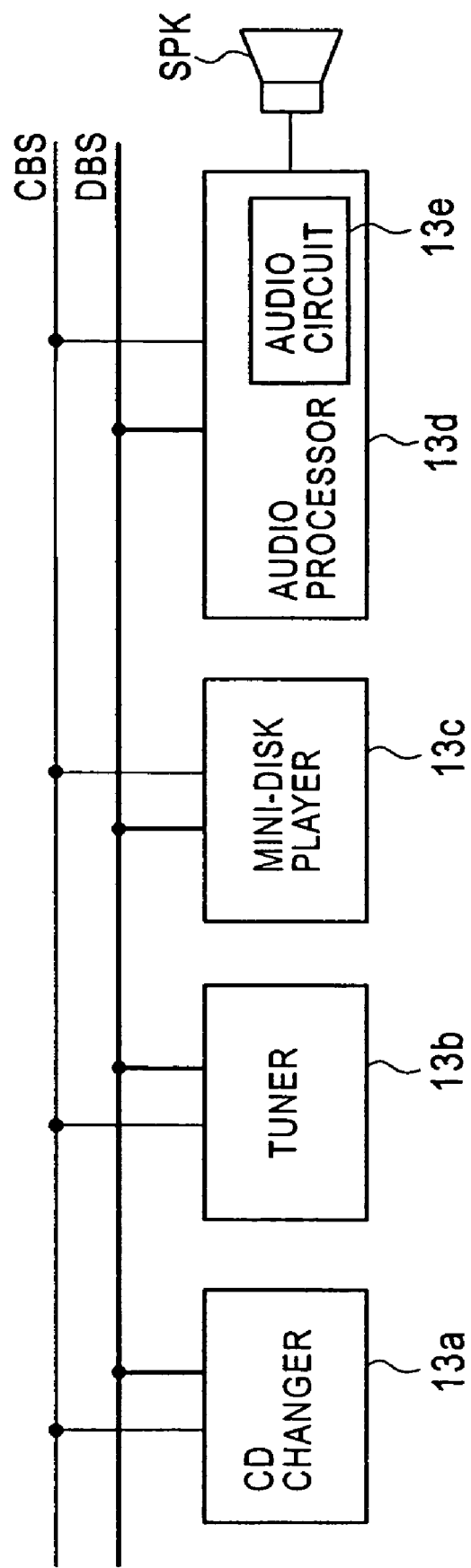
FIG. 2 is a block diagram of an audio unit.

As shown in FIG. 2, the audio unit 13 includes a CD changer 13*a*, a tuner 13*b*, a minidisc player 13*c*, and an audio processor 13*d*, which are connected to each other through a bus. Audio data such as music data or navigation guidance voice or sound data provided by an audio source is selectively provided to an audio circuit 13*e* and produced by the speaker SPK.

The management controller 14 includes a processor, a control program memory (ROM), a data memory (RAM) 14*a*, and a bus connection port. The data memory 14*a* is backed with a battery. The data memory 14*a* is used to store (1) a list of image numbers assigned to images stored on the hard disk drive HDD, and (2) a table representing the correspondence between actions and images. Examples of actions are (1) reception of an incoming telephone call or transmission of an outgoing telephone call via the hands-free telephone, (2) playback of music data stored on the hard disk drive, and (3) turning-off of the display. Storing of the correspondence between actions and images stored on the hard disk driver HDD makes it possible to, when an action occurs, display an image relevant to the action and an image related to the action. For example, if an image is related to each telephone communication party (for example, if a portrait of an individual or a landscape picture of a residence is related to each communication party), it is possible to display an image related to a communication party when an incoming call from or an outgoing call to the communication party is received or transmitted. By relating each music album to a jacket image of a CD or an image of an artist, it is possible to display a jacket image of a CD or an image of an artist when a corresponding music album is played back. It is also possible to display a particular image when the display is turned off.

The display 15 is in the form of a touch panel. A map, menus, operation keys (in the form of softkeys), etc. are displayed on a screen 15*a* of the display 15. A command or data can be entered by touching a menu or a softkey displayed on the screen 15*a*. If a menu key MK is clicked, a menu screen is displayed in a side area of the display screen 15*a*. The voice or sound volume can be increased or decreased by operating volume buttons VOL. When a command is entered through an operation key, the management controller 14 transfers the command to one of units 11 to 13 depending on the status of the in-vehicle apparatus.

The hard disk device 16 includes a hard disk HDD 16*a* and a HDD control unit 16*b*. Image data and voice or sound data corresponding to actions are stored on the hard disk 16*a*. A music rack is formed by storing audio data in units of albums from the CD changer to the hard disk 16*a*.

The memory stick device 17 includes a memory stick (MS) 17*a* and a MS control unit 17*b*. Image data and/or voice or sound data may be stored on the hard disk HDD from the memory stick (MS) so that image data or voice or sound data corresponding to an action is read from the hard disk HDD and displayed on the display 15 or produced from the speaker SPK.

Figure 3:
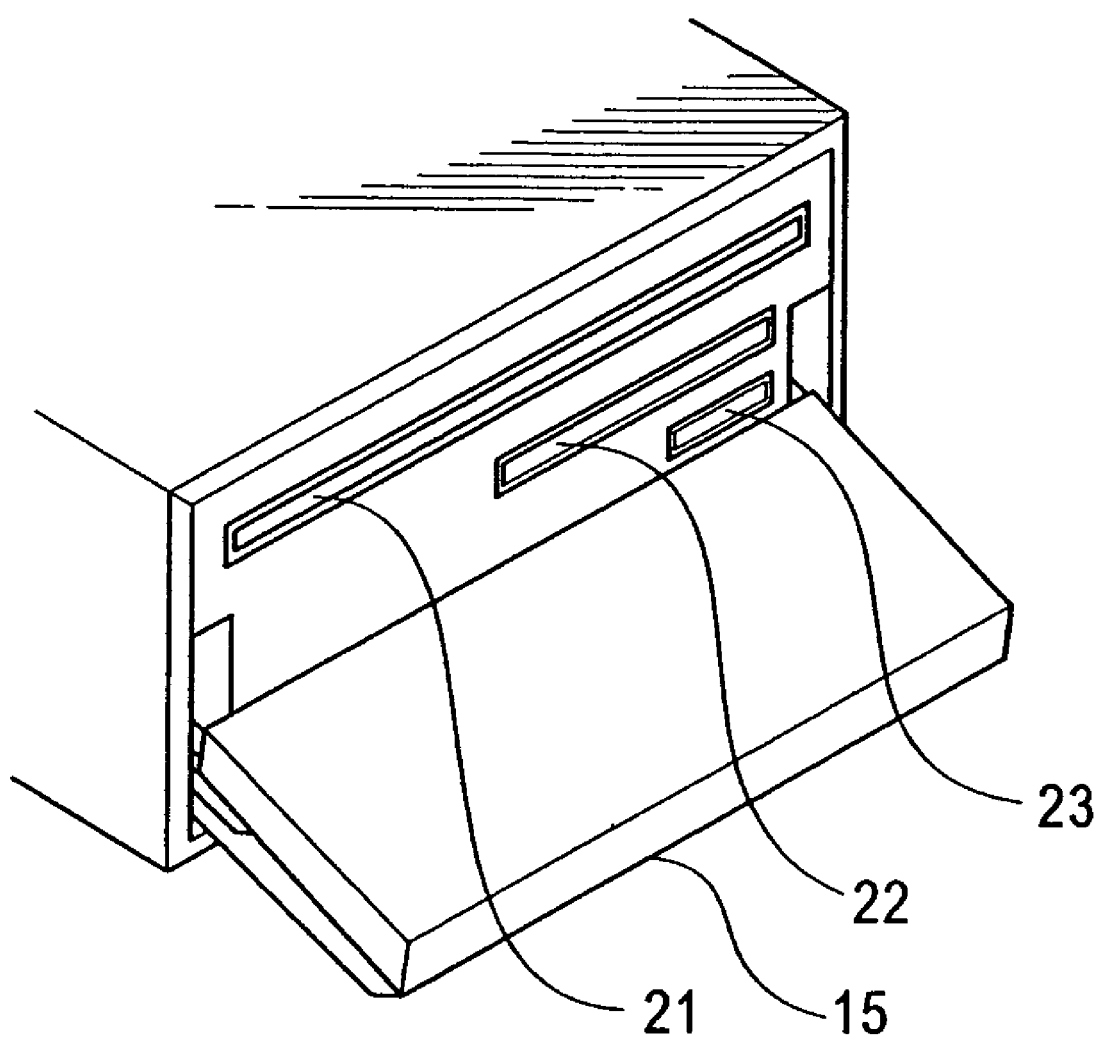
FIG. 3 is a schematic diagram showing a mechanism for opening/closing a front panel of an in-vehicle apparatus.

The in-vehicle apparatus is in the form of a box, and the display 15 with the touch panel is disposed on the front surface of the box in such a manner that the display 15 is openable. Although the display 15 is usually closed, it is opened as shown in FIG. 3 when a storage medium such as a CD, a minidisc, or a memory stick (MS) is inserted into or removed from a corresponding drive mechanism, and the storage medium is inserted into or removed from a corresponding insertion/ejection slot 21 to 23.

FIGS. 4A and 4B show examples of data stored in the data memory 14*a* in the management controller 14. The data stored in the data memory 14*a* includes the list of images stored on the hard disk HDD (FIG. 4A) and the table representing the correspondence between actions and images (FIG. 4B). The image list shown in FIG. 4A is created or updated when an image is stored from the memory stick MS to the hard disk HDD. The correspondence table shown in FIG. 4B includes (1) image IDs, (2) data UDT indicating whether each action (hands-free telephone (HFT) communication, a music rack (MR), or a wallpaper) uses a particular image, and (3) detailed information on usage of images DTL (communication parties, album names, etc.). The correspondence table is created or updated when a correspondence is defined or an image is deleted.

Menu Screen and Setting Screen

FIG. 5A shows a menu screen that is displayed when the menu key MK is clicked, and FIG. 5B shows a setting screen that is displayed when a CHANGE SETTING button on the menu screen shown in FIG. 5A is clicked.

If one of buttons MUSIC RACK, CD/DVD, MD, RADIO, TV, and MEMORY STICK on the menu screen is clicked, an operation screen for audio, radio, TV, etc. appears depending on the clicked button. If a CURRENT POSITION button is clicked, a navigation screen is displayed. If a MULTI button is clicked, two screens are displayed. If a FIND DESTINATION button, a READ INFORMATION button, or the CHANGE SETTING button is clicked, a screen for searching for a destination to which navigation is to be performed, a screen for making system settings, or the like appears depending on the clicked button. If a TELEPHONE button is clicked, a screen for making a telephone call in a hands-free mode appears. If a DISPLAY OFF button is clicked, the currently displayed screen is turned off and wallpaper is displayed. Of the softkeys shown in FIG. 5B, an IMAGE SETTING key and a DISPLAY-OFF SETTING key are used in the present invention. The IMAGE SETTING key is used to register an image in the hard disk or delete an image from the hard disk. The DISPLAY-OFF SETTING key is used to specify wallpaper.

Registration of Images

Figure 6:
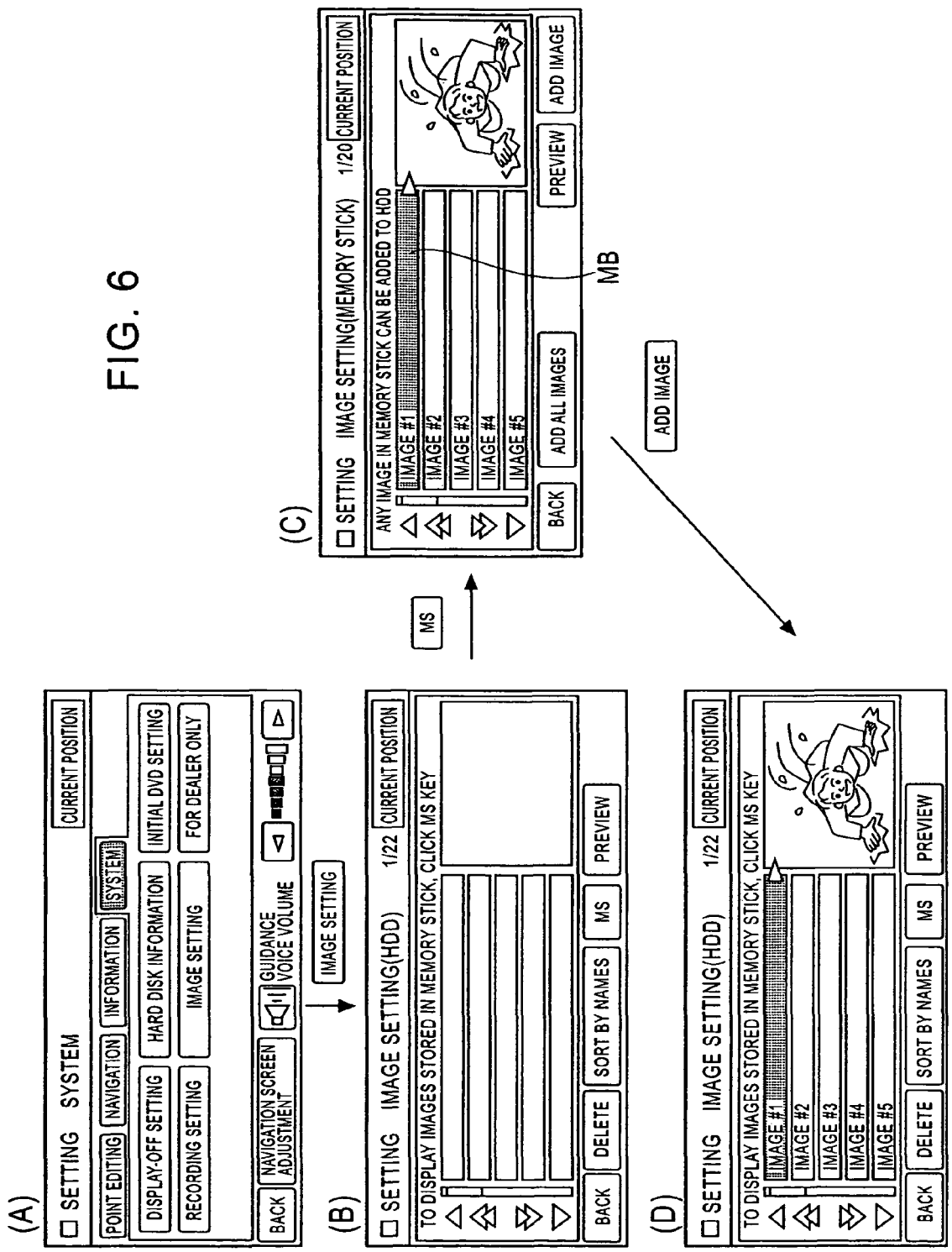
FIGS. 6A to 6D show a flow of registering images stored in a memory stick to a hard disk.

FIGS. 6A to 6D show a flow of registering an image stored in the memory stick MS to the hard disk HDD. If an IMAGE SETTING button on a setting screen shown in FIG. 6A is clicked, an image setting screen shown in FIG. 6B appears. On this screen, if a MS (Memory Stick) button is clicked, an image number list is read from the MS and displayed as shown in FIG. 6C. On this screen, an image corresponding to an image number selected by a menu bar MB is generated and displayed. On this screen shown in FIG. 6C, if an ADD IMAGE button is clicked, the image being currently displayed is related to the image ID (image #1 in this specific example) selected by the menu bar MB, and the resultant correspondence is registered in the hard disk HDD (see FIG. 6D). The management controller 14 adds this image ID to the image list (FIG. 4A) stored in the data memory 14*a*. Any other image stored in the memory stick MS can be registered in a similar manner. On the screen shown in FIG. 6C, if an ADD ALL IMAGES button is clicked, all images stored in the MS are registered in the hard disk HDD.

Setting of an Image to be Displayed When an Incoming or Outgoing Hands-Free Telephone Call is Received or Transmitted FIGS. 7A to 7X show a flow of setting an image to be displayed when an incoming or outgoing hands-free telephone call is received or transmitted. On the menu screen, if the TELEPHONE button is clicked, a telephone number screen shown in FIG. 7A appears. On this screen, if a telephone call is made, a communication party selected by a menu bar MB is specified as the destination of the telephone call, and a telephone communication screen shown in FIG. 7X appears. On this screen, if no image corresponding to the destination (communication party) is registered, a default image indicating that a telephone communication is being performed is displayed in an image area S1 of the screen. On the other hand, if the IMAGE button on the screen shown in FIG. 7A is clicked, then as shown in FIG. 7B the default image and the image list registered in the hard disk HDD are displayed. Here, image #1 is the default image. On this screen, if image #2 is selected by the menu bar MB, then an image with image ID=image #2 is displayed instead of the default image, as shown in FIG. 7C. Here, if an OK button is clicked, image #2 is set as a telephone call image that is displayed when a telephone call to or from "Alpine Taro" is transmitted or received. The screen is then switched to a screen shown in FIG. 7D similar to that shown in FIG. 7A, and registration of the image is completed. The management controller 14 adds the new correspondence defined above to the correspondence table stored in the data memory 14a, that is, "image ID=image #2, HFT=used, communication party=Alpine Taro" is added to the correspondence table.

If a telephone call is made after registration is made in the above-descried manner, then, unlike the case shown in FIG. 7X, an image related to a communication party is displayed in the area S1 of the screen, as shown in FIG. 7E. On the screen shown in FIG. 7D, if the IMAGE button is clicked, then the image list is displayed and an icon AICN indicating an action is displayed in a superimposed manner in a field of an image number to which the action is related so that a user can easily understand which image is related to which action.

Setting of Images Displayed when Music is Played Back

FIGS. 8A to 8G show a flow of setting an image to be displayed when music is played back using the music rack. On the menu screen, if a MUSIC RACK button is clicked, an initial playback screen of the music rack appears as shown in FIG. 8A. On this screen, if an EDIT button is clicked, a list of music numbers of a first album is displayed. In this situation, if no image corresponding to the first album is registered, a default image is displayed in the image area S1 of the screen. In this state, if an IMAGE button is clicked, then the default image and the image list registered in the hard disk HDD are displayed as shown in FIG. 8C. Note that an icon AICN is displayed to indicate that image #2 has been registered as an image that is displayed when an incoming or outgoing hands-free telephone call is received or transmitted.

On this screen, if image #2 is selected by the menu bar MB, then an image with image ID=image #2 is displayed instead of the default image, as shown in FIG. 8D. Here, if an OK button is clicked, image #2 is set to be related to album #1, the screen is switched to a screen shown in FIG. 8E, and registration of the image is completed. The management controller 14 adds the new correspondence defined above to the correspondence table stored in the data memory 14a, that is, "image ID=image #2, MR (Music Rack)=used, Album=Album #1" is added to the correspondence table.

If playback of album #1 is started after registration is made in the above-described manner, then, unlike the case shown in FIG. 8A, the image related to album #1 is displayed in the area S1 of the screen as shown in FIG. 8F. On the screen shown in FIG. 8E, if the IMAGE button is clicked, the image list is displayed as shown in FIG. 8G and an icon AICN is displayed in the field of image number 2 to indicate that image #2 is related to actions HFT and MR. This makes it possible for a user to easily understand which image is related to which action.

Setting of an Image to be Displayed when the Display is Turned Off

Figure 9:
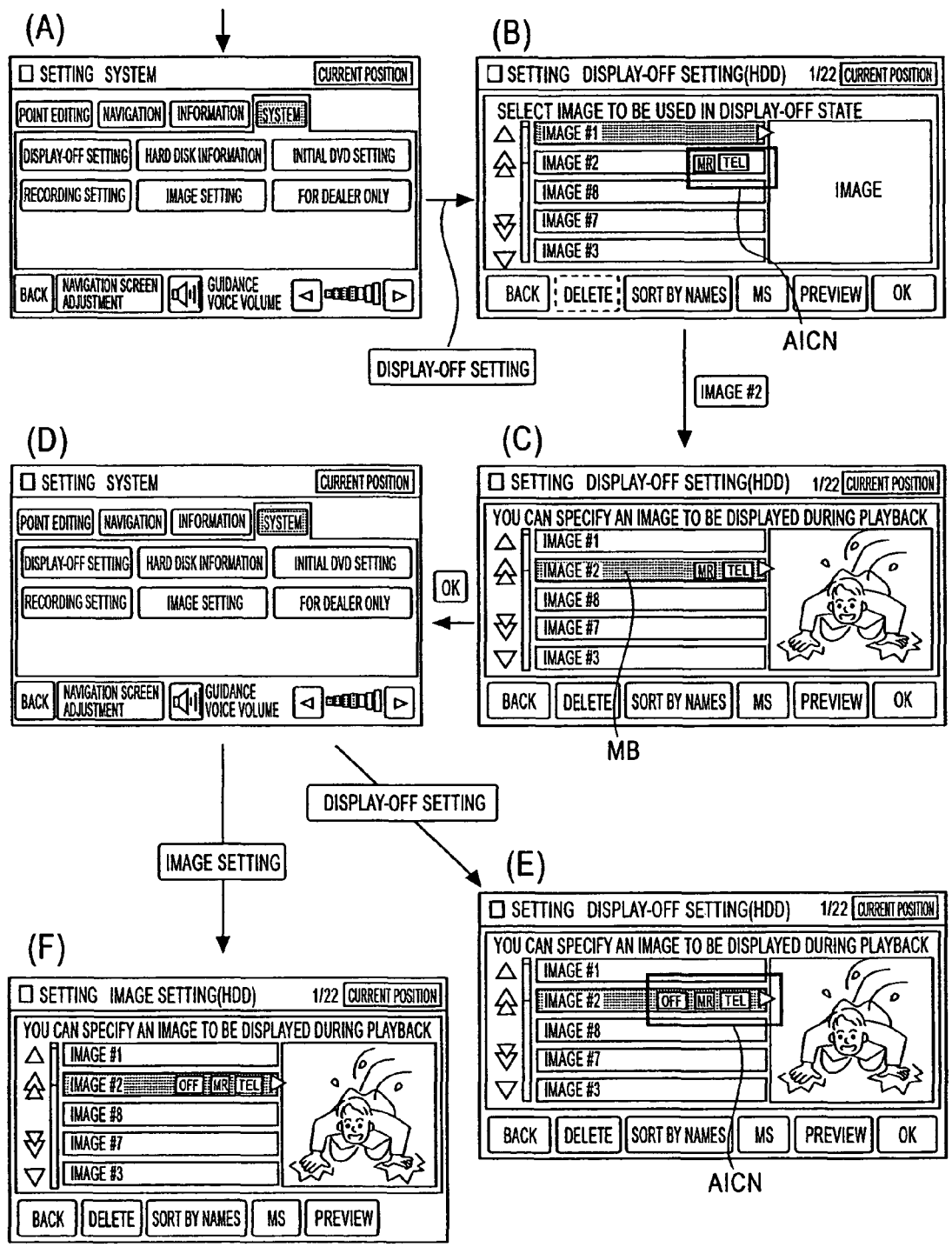
FIGS. 9A to 9F show a flow of setting an image that is displayed when a display is turned off.

FIG. 9 shows a flow of setting an image that is displayed when the display is turned off. If the DISPLAY OFF SETTING button on the setting screen shown in FIG. 9A is clicked, then as shown in FIG. 9B the default image and the image list registered in the hard disk HDD are displayed. In this specific example, image #1 is the default image. Furthermore, an icon AICN is displayed to indicate that image #2 is registered as an image that is displayed when a hands-free telephone call is received or transmitted and also as an image that is displayed when a music album is played back.

On this screen, if image #2 is selected by the menu bar MB, then an image with an image ID=image #2 is displayed instead of the default image, as shown in FIG. 9C. Here, if the OK button is clicked, image #2 is set as the wallpaper, and the screen is switched to a screen shown in FIG. 9D similar to that shown in FIG. 9A, and registration of the image is completed. The management controller 14 adds the new correspondence defined above to the correspondence table stored in the data memory 14a, that is, "image ID=image #2, wallpaper=used" is added to the correspondence table.

After registration is made in the above-described manner, If the DISPLAY OFF SETTING button is clicked, the image list is displayed on the screen and furthermore the image with image ID=image #2 is displayed in the image area S1 of the screen as shown in FIG. 9E. Furthermore, an icon AICN is displayed to indicate that image #2 is registered as an image that is displayed when a hands-free telephone call is received or transmitted, as an image that is displayed when a music album is played back, and also as the wallpaper. On the other hand, if the IMAGE SETTING button on the screen shown in FIG. 9D is clicked, then as shown in FIG. 9F, as in the case of FIG. 9E, the image list is displayed on the screen, the image with image ID=image #2 is displayed in the image area S1 of the screen, and furthermore the icon AICN is displayed to indicate that image #2 is registered as an image that is displayed when a hands-free telephone call is received or transmitted, as an image that is displayed when a music album is played back, and also as the wallpaper.

Figure 7:
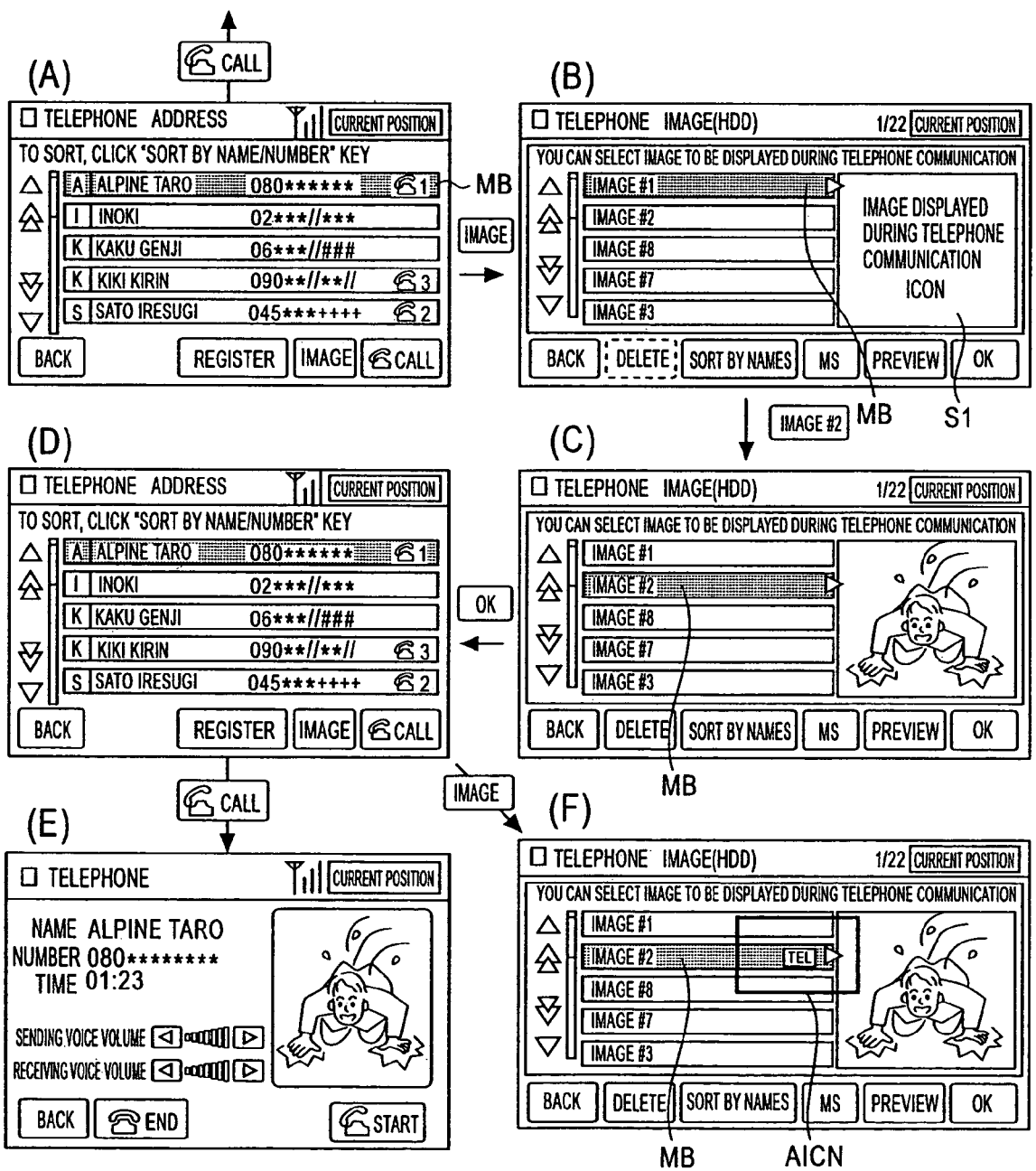
FIGS. 7A to 7F and FIG. 7X show a flow of setting an image that is displayed when an incoming or outgoing hands-free telephone call is received or transmitted.
Figure 8:
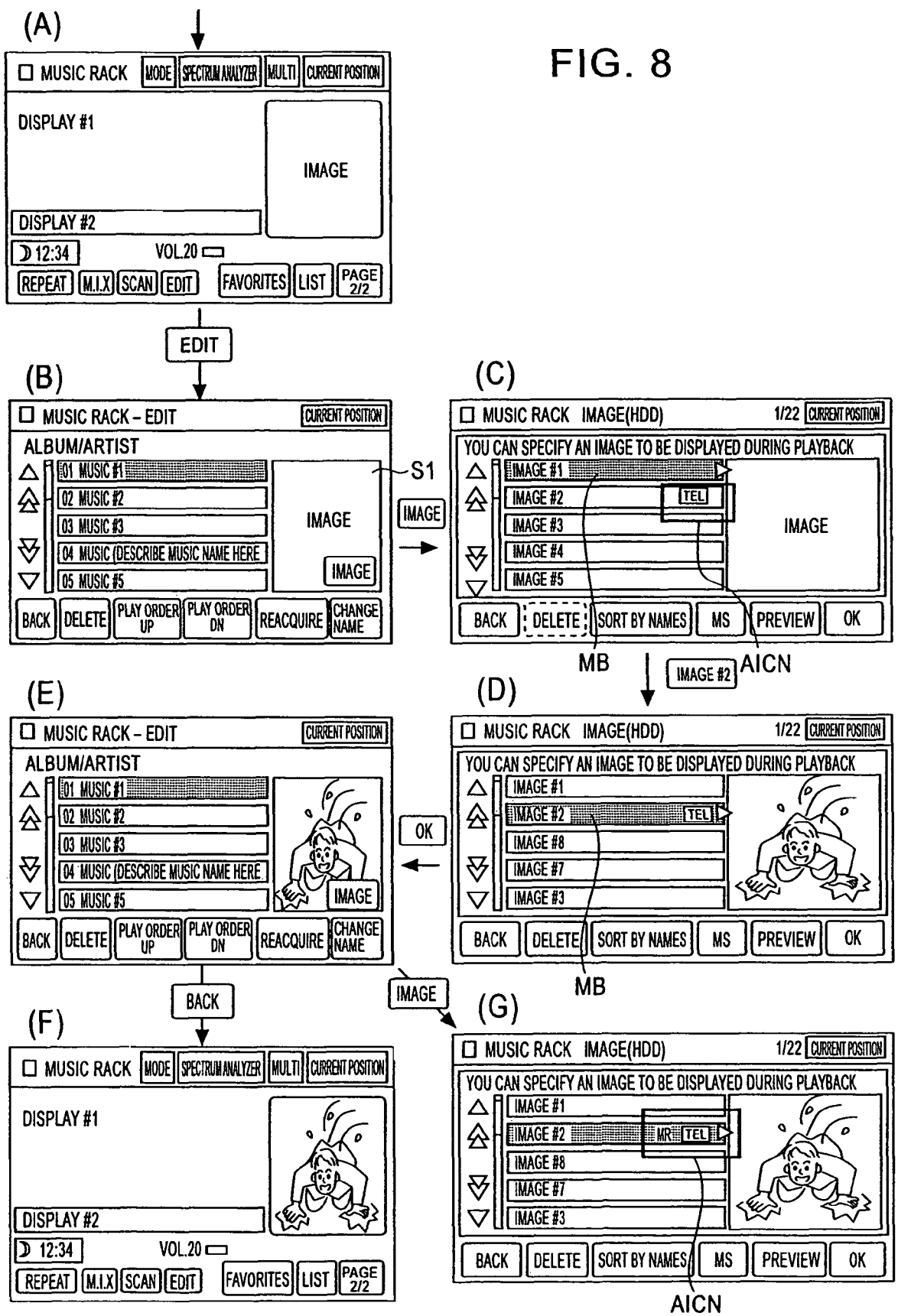
FIGS. 8A to 8G show a flow of setting an image that is displayed when music is played back using a music rack.

When the image list is displayed as shown in FIGS. 7 to 9, if a DELETE button is clicked, an image selected by the menu bar MB is deleted. Because an icon indicating an action related to an image is displayed in a corresponding image number field, a user can recognize whether each image is used or not, and, if an image is used, which action the image is used for. This prevents a necessary image from being deleted by mistake.

First Method of Deleting an Image

FIGS. 10A to 10D show a flow of a first method of deleting an image from the hard disk HDD.

On a setting screen shown in FIG. 10A, if an IMAGE SETTING button is clicked, then an image list and a default image are displayed on the screen as shown in FIG. 10B. On this screen, if image #2 is selected by the menu bar MB, the image with image ID=image #2 is displayed instead of the default image, as shown in FIG. 10C. An icon is also displayed to indicate that image #2 is assigned to the hands-free telephone call. If a user does not like image #2, the user can delete image #2 by clicking the DELETE button. If the DELETE button is clicked, then image #2 is deleted from the hard disk HDD and the resultant image list is displayed as shown in FIG. 10D. The management controller 14 removes image #2 from the image list stored in the data memory 14a and deletes the description of the correspondence associated with image #2. In this first deleting method, icons are displayed to indicate which image is used for which action, and thus a necessary image is prevented from being deleted by mistake. That is, it is ensured that only an unnecessary image is deleted.

Second Method of Deleting an Image

FIGS. 11C to 11G show a flow of a second method of deleting an image from the hard disk HDD.

Figure 11:
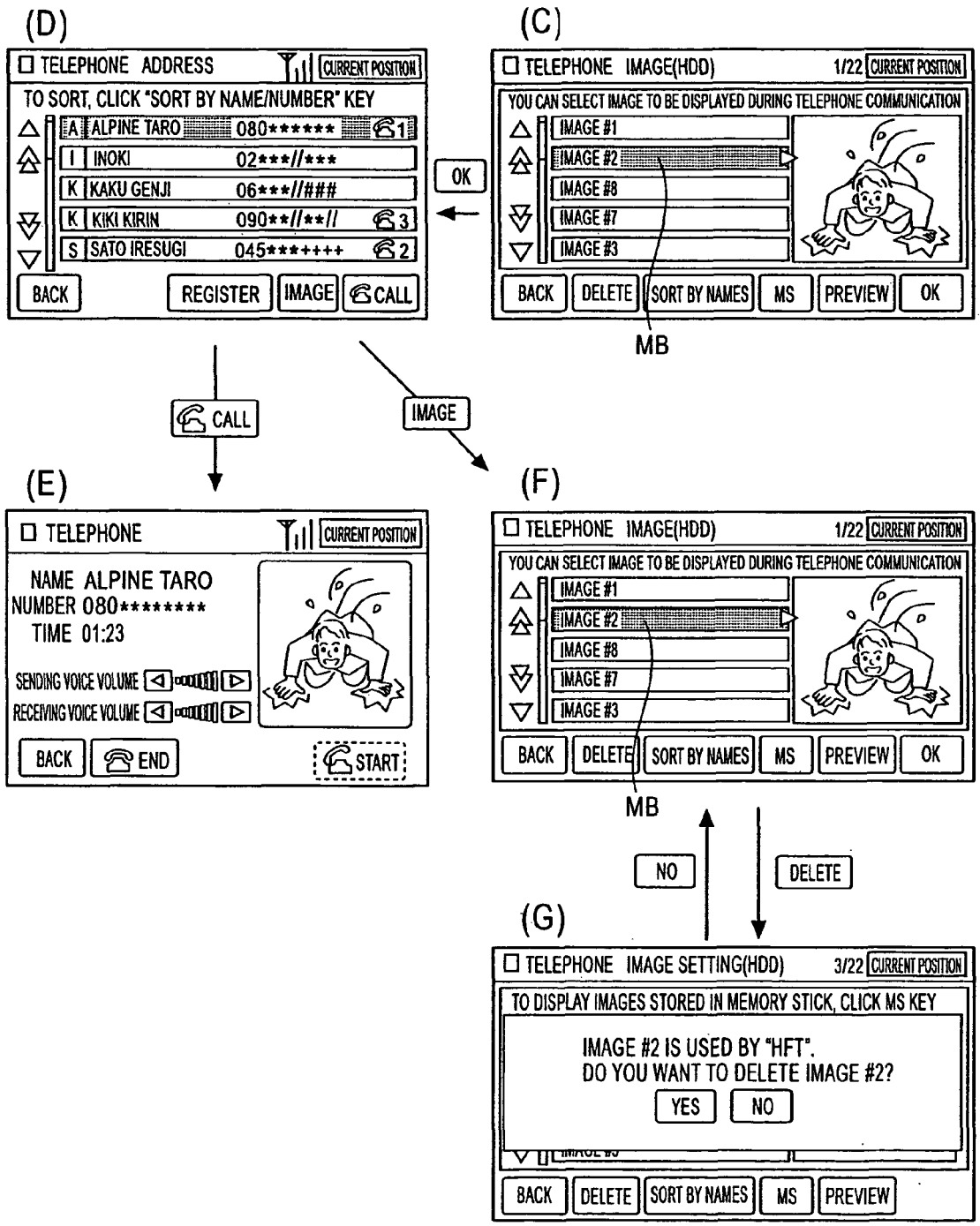
FIGS. 11C to 11G show a flow of another method of deleting an image from a hard disk.
Figure 12:
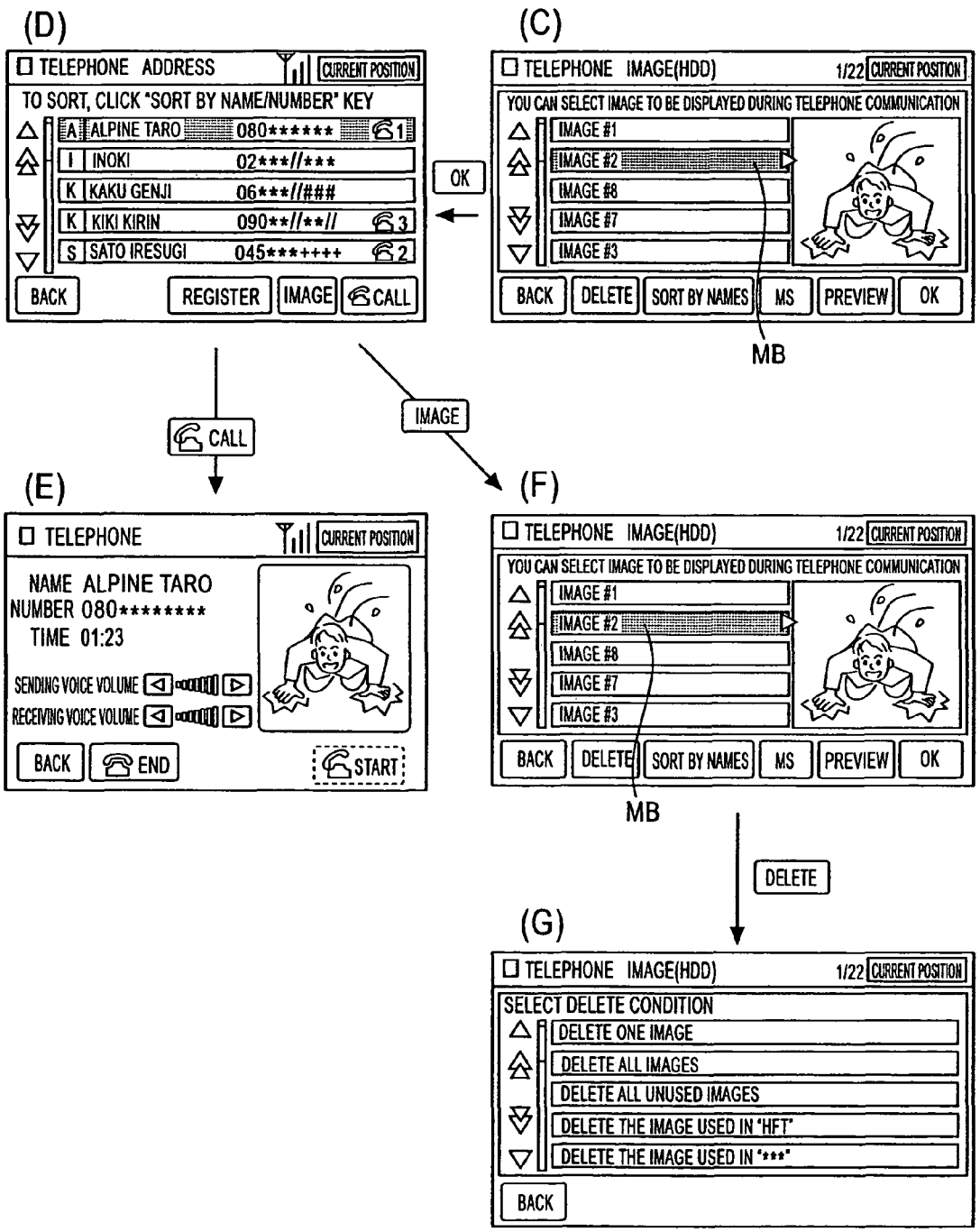
FIGS. 12C to 12G show a flow of another method of deleting an image from a hard disk.

FIGS. 11C to 11E are similar to FIGS. 7C to 7E, in which image #2 is set as an image that is displayed when a hands-free telephone call from or to "Alpine Taro" is received or transmitted. On the screen shown in FIG. 11D, if an IMAGE button is clicked, an image list is displayed as shown in FIG. 11F. However, unlike the case of FIG. 7, an icon indicating a related action is not displayed. If a user does not like the displayed image, the user can delete the image by clicking a DELETE button. In response, a warning message indicating that the specified image (image #2 in this specific example) is used for a particular action is displayed as shown in FIG. 11G to prevent a necessary image from being deleted by mistake. If a YES button is clicked on the screen shown in FIG. 11G, image #2 is deleted from the hard disk HDD. The management controller 14 removes image #2 from the image list stored in the data memory 14a and deletes the description of the correspondence associated with image #2. In this second deleting method, because the warning message is displayed as shown in FIG. 11, G a necessary image is prevented from being deleted by mistake.

Third Method of Deleting an Image

FIGS. 12C to 12G show a flow of a third method of deleting an image from the hard disk HDD.

FIGS. 12C to 12E are similar to FIGS. 7C to 7E, in which image #2 is set as an image that is displayed when a hands-free telephone call from or to "Alpine Taro" is received or transmitted. On the screen shown in FIG. 12D, if an IMAGE button is clicked, an image list is displayed as shown in FIG. 12F. However, unlike the case of FIG. 7, an icon indicating a related action is not displayed. If a user does not like the displayed image, the user can delete the image by clicking a DELETE button. In response, as shown in FIG. 12G, a selection menu is displayed to prompt the user to select a deleting condition from (1) only an image being currently displayed is deleted, (2) all images are deleted, (3) all unused images are deleted, and (4) images related to respective actions (hands-free telephone call, music rack, wallpaper) are deleted. If the user selects a condition from the selection menu by a menu bar, the specified image(s) is deleted.

In this third deleting method, only unused images or images related to specified actions are deleted, and thus it is possible to easily delete only unused images or images related to specified actions.

Registration of Voice/Sound

In the embodiments described above, settings are made in terms of images. Similarly, it is possible to make settings in terms of voices or sounds. That is, registration of voices or sounds in the hard disk, setting of voices or sounds so as to be related to particular actions (incoming hands-free telephone call, key operation, etc.), and deleting of voices or sounds from the hard disk can be performed in a similar manner.

Figure 13:
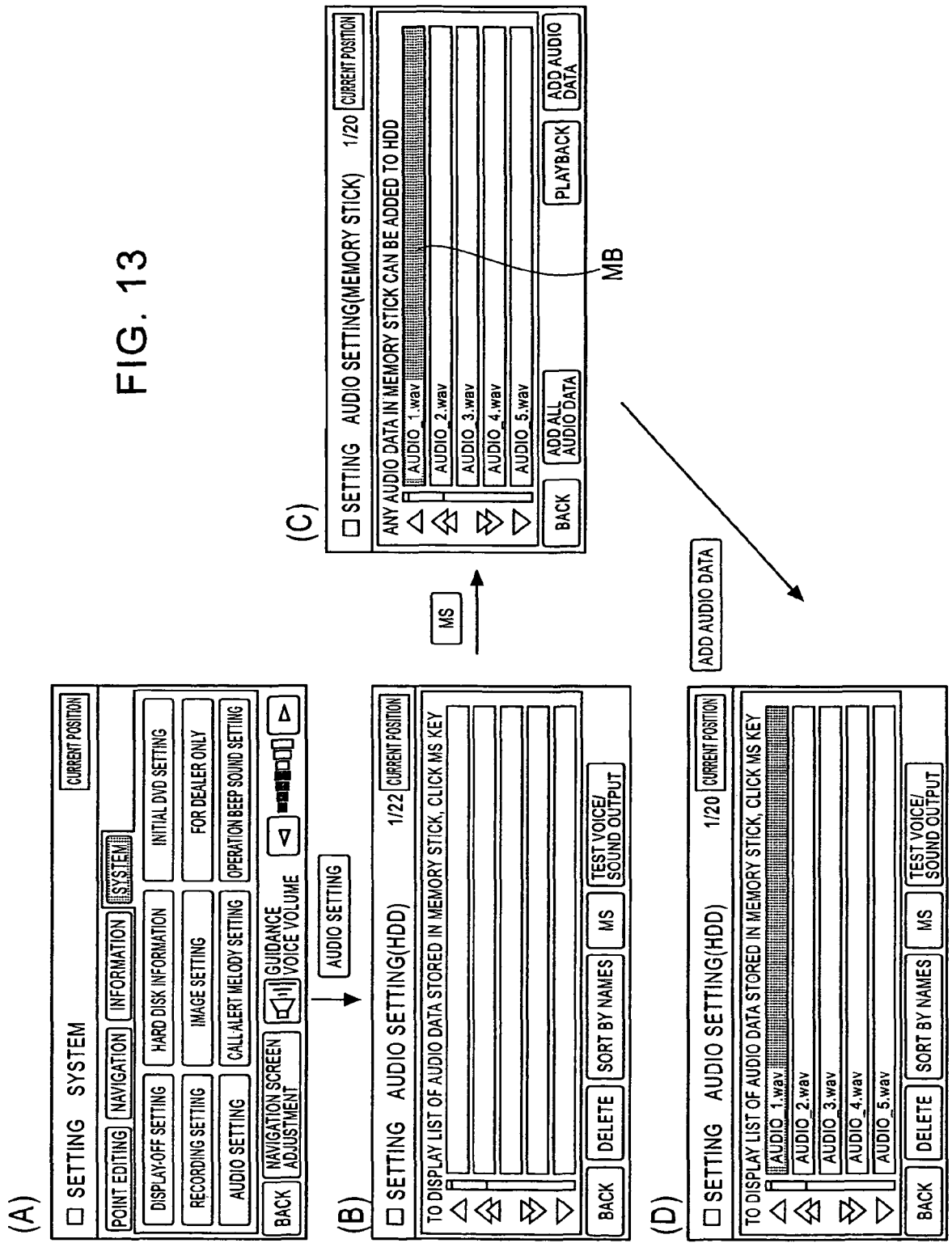
FIGS. 13A to 13D show a flow of registering audio data stored in a memory stick to a hard disk.

FIGS. 13A to 13D show a flow of registering a voice or sound stored in the memory stick MS to the hard disk HDD. After a setting screen shown in FIG. 13A is selected from a menu screen, if an AUDIO SETTING button on a setting screen shown in FIG. 6A is clicked, a screen for registering audio data in the hard disk appears as shown in FIG. 13B. On this audio data registration screen, if a MS button is clicked, a list of audio data numbers is read from the MS and displayed as shown in FIG. 13C, and audio data selected by a menu bar MB is produced from the speaker SPK of the audio unit 13. On this screen shown in FIG. 13C, if an ADD AUDIO DATA button is clicked, audio data is assigned an audio ID (AUDIO_1.wav) and is registered in the hard disk HDD (see FIG. 13D). The management controller 14 adds this audio ID to the audio data list (FIG. 4A) stored in the data memory 14a. Any other audio data stored in the memory stick MS can be registered in a similar manner. On the screen shown in FIG. 13C, if an ADD ALL AUDIO DATA button is clicked, all audio data stored in the MS are registered in the hard disk HDD.

Setting of a Telephone Call Alert Melody

Figure 14:
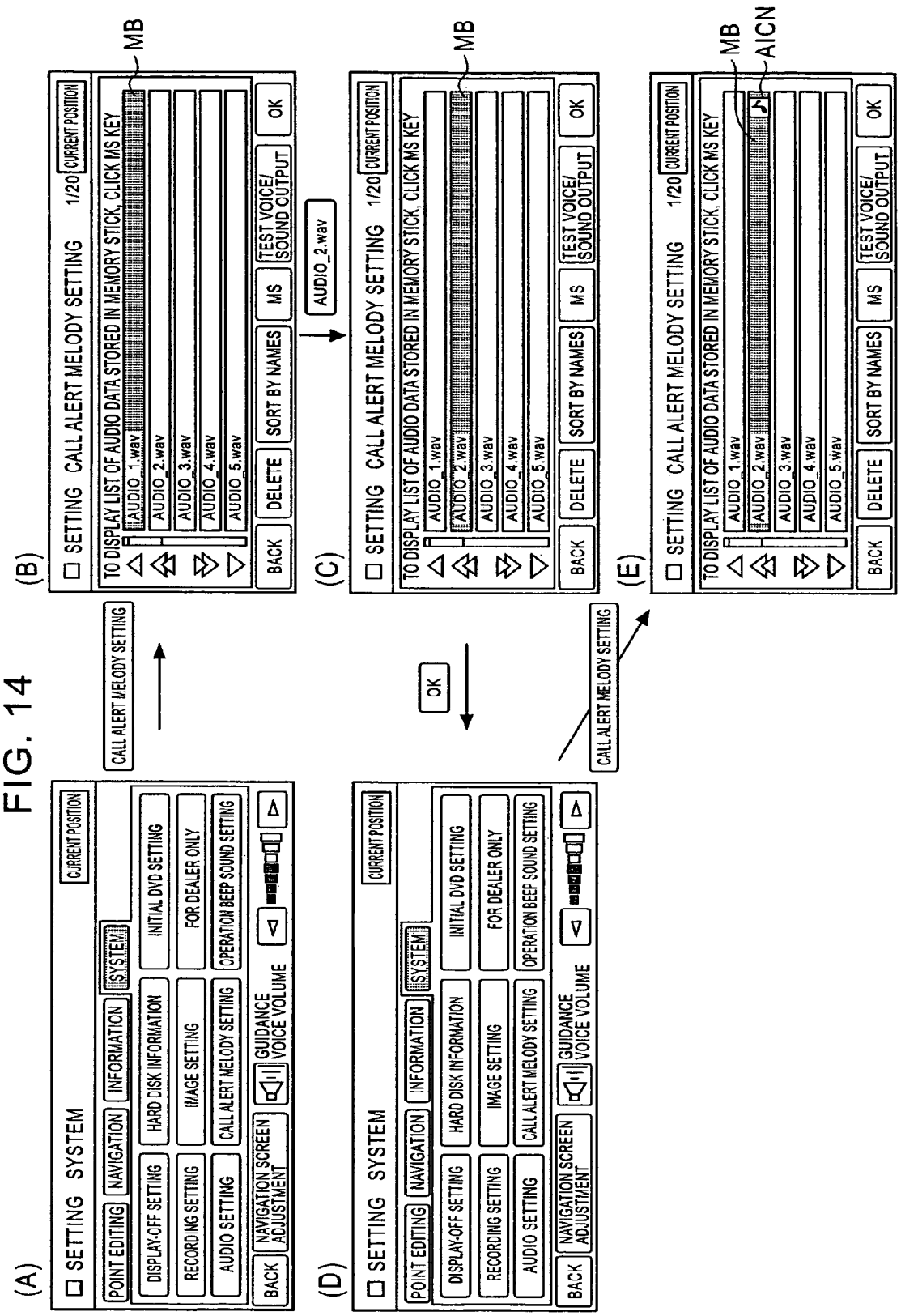
FIGS. 14A to 14E show a flow of setting an image that is displayed when an incoming hands-free telephone call arrives.

FIGS. 14A to 14E show a flow of setting a melody that is produced when an incoming hands-free telephone call arrives. If a CALL ALERT MELODY SETTING button on a setting screen shown in FIG. 14A is clicked, then as shown in FIG. 14B a list of audio data registered in the hard disk is displayed on the screen, and a voice or sound corresponding to default audio data is produced. In this specific example, AUDIO_1.wav is set as the default audio data. On this screen, if AUDIO_2.wav is selected by a menu bar MB, then a voice or sound corresponding to AUDIO_2.wav is produced as shown in FIG. 14C. Here, if an OK button is clicked, AUDIO_2.wav is set as the telephone call alert melody, and the screen is switched to a screen shown in FIG. 14D similar to that shown in FIG. 14A, and the setting of the telephone call alert melody is completed. The management controller 14 adds the new correspondence defined above to the correspondence table stored in the data memory 14a, that is, "audio ID=AUDIO_2wav, telephone call alert melody=used" is added to the correspondence table.

After the setting described above is made, if the CALL ALERT MELODY SETTING button shown in FIG. 14D is clicked to confirm or change the setting in terms of the telephone call alert melody, then an audio data list is displayed as shown in FIG. 14E and an icon AICN is also displayed to indicate that AUDIO_2.wav is set as the telephone call alert melody. Displaying of an icon AICN in a field of audio data number to indicate that the audio data is assigned to an action in the above-described manner makes it possible for a user to understand which audio data is assigned to which action. Thus, necessary audio is prevented from being deleted by mistake in a deleting operation.

It is possible to set audio data as a telephone call alert melody for a particular caller. In this case, when the CALL ALERT MELODY SETTING button is clicked, a telephone number table similar to that shown in FIG. 7 is displayed to allow a user to register a telephone call alert melody for a particular telephone communication party in a similar manner as in the case of the registration of images.

On the setting screen, if an OPERATION BEEP SOUND SETTING button is clicked, a screen appears which allows a user to make settings in terms of an operation beep sound. If desired, different sounds may be assigned to different operation keys.

Deleting of Audio Data

FIGS. 15A and 15B shows a flow of deleting audio data.

In a state in which audio data is assigned to an action, if an AUDIO SETTING button on a setting screen shown in FIG. 15A is clicked, then the management controller 14 displays a list of audio data registered on the hard disk HDD as shown in FIG. 15B. Icons AICN indicating actions are also displayed in corresponding audio data ID fields to notify a user which audio data is assigned to which action. This allows the user to select unnecessary audio data. After unnecessary audio data is selected by a menu bar MB, if a DELETE button is clicked, the selected audio data is deleted from the hard disk HDD. The voice or sound corresponding to the audio data selected by the menu bar MB may be produced, or a music name thereof may be displayed.

Audio data may be deleted in a similar manner to that of the second or third method of deleting images described above with respect to FIG. 11 or 12. That is, when the audio data list is displayed (but no icons are displayed), if a command to delete particular audio data is issued, a warning message indicating that the specified audio data is assigned to a particular action is displayed in a similar manner to FIG. 11G. In this situation, if a YES button is clicked, the audio data is deleted. This prevents necessary audio data from being deleted by mistake.

Alternatively, when the audio data list is displayed (but no icons are displayed), if a command to delete particular audio data is issued, then in a similar manner to FIG. 12G, a selection menu is displayed to prompt the user to select a deleting condition from (1) only audio data being currently selected by the menu bar is deleted, (2) all audio data are deleted, (3) all unused audio data are deleted, and (4) audio data assigned to particular actions (telephone call arrival, key operation, etc.) are deleted. If the user selects a condition from the selection menu by the menu bar, the specified audio data is deleted. In this deleting method, only unused audio data or audio data assigned to specified actions are deleted, and thus it is possible to easily and quickly delete only unused audio data or audio data assigned to specified actions.

Although in the embodiments described above, the present invention is applied to an in-vehicle apparatus by way of example, the present invention may also be applied to other apparatus such as a personal computer, a portable telephone, etc.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A processing apparatus adapted to, when a particular action occurs, display an image assigned to the action, the processing apparatus comprising:

an image storage unit adapted to store image data of a plurality of images;

a memory unit having a correspondence table configured to store data for the plurality of images;

the correspondence table having for each image, an image identifier uniquely identifying a particular image, one or more action identifiers, each action identifier corresponding to an action associated with the particular image, and a usage indicator indicating whether the particular image is in use or not in use;

when an image is assigned to a particular action, a correspondence between the action and the assigned image is stored in the action identifier of correspondence table;

a control unit adapted to perform a control such that when a particular action occurs, an image assigned to the action is displayed, and such that when a list of images stored in the correspondence table is displayed, the correspondence between images and actions is explicitly represented in the list of images in the correspondence table using an icon; and wherein when the image is assigned to a plurality of actions, the control unit displays one or more icons indicating each of the plurality of actions.

2. The processing apparatus according to claim 1, further comprising an image generator adapted to read image data from a storage medium, in which a plurality of images are stored, and enter the image data to the image storage unit, wherein the control unit sequentially displays images stored in the storage medium in accordance with a request and stores image data of a specified image into the image storage unit.

3. The processing apparatus according to claim 1 wherein when an image, which is displayed when an incoming or outgoing telephone call is received or transmitted, is assigned to a communication party, the control unit displays the list of images in such a manner that any such action related to each image is explicitly shown in the list of images.

4. The processing apparatus according to claim 1, further comprising a hard disk, wherein when an image, which is displayed when music data stored on the hard disk is played back, is assigned to a music album, the control unit displays the list of images in such a manner that any such action related to each image is explicitly shown in the list of images.

5. The processing apparatus according to claim 1 wherein when an image is specified which is displayed when a display-off command is issued, the control unit displays the list of images in such a manner that any such action related to each image is explicitly shown in the list of images.

6. A processing apparatus adapted to, when a particular action occurs, display an image assigned to the action, the processing apparatus comprising:

an image storage unit adapted to store image data of a plurality of images;

a memory unit having a correspondence table configured to store data for the plurality of images;

the correspondence table having for each image, an image identifier uniquely identifying a particular image, one or more action identifiers, each action identifier corresponding to an action associated with the particular image, and a usage indicator indicating whether the particular image is in use or not in use;

when an image is assigned to a particular action, a correspondence between the action and the assigned image is stored in the action identifier of correspondence table;

an image deletion command unit adapted to issue a command to delete an image from the correspondence table; and a control unit adapted to perform a control such that when a particular action occurs, an image assigned to the action is displayed, and such that when a list of images is displayed, if a command to delete an image from the correspondence table is issued, an action name currently assigned to the image specified to be deleted is displayed and a warning message is issued that the image will be deleted; and deleting the image selected from the correspondence table upon an affirmative indication disregarding the warning.

7. A processing apparatus adapted to, when a particular action occurs, display an image assigned to the action, the processing apparatus comprising:

an image storage unit adapted to store image data of a plurality of images;

a memory unit having a correspondence table configured to store data for the plurality of images;

the correspondence table having for each image, an image identifier uniquely identifying a particular image, one or more action identifiers, each action identifier corresponding to an action associated with the particular image, and a usage indicator indicating whether the particular image is in use or not in use;

when an image is assigned to a particular action, a correspondence between the action and the assigned image is stored in the action identifier of correspondence table, wherein the correspondence is represented by an icon, and wherein when the image is assigned to a plurality of actions, one or more icons indicating each of the plurality of actions is displayed;

an image deletion command unit adapted to issue a command to delete a particular image, all unused images, or all images assigned to specified one or more actions from the correspondence table; and a control unit adapted to perform a control such that when a particular action occurs, an image assigned to the action is displayed in accordance with the correspondence stored in the correspondence table, and such that when a command to delete an image selected from a displayed list of images is issued, a selection menu is displayed to allow a selection of a deleting condition from among at least one of deleting the currently selected image, deleting all unused images, and deleting all images assigned to one or more particular actions, and, if a deleting condition is selected, then deleting the currently selected image, deleting all unused images, or deleting all images assigned to one or more particular actions is performed in accordance with the selected deleting condition.

8. The processing apparatus according to claim 7, wherein the processing apparatus is disposed in one of a personal computer, an in-vehicle apparatus, and a portable telephone device.

* * * * *